(12) United States Patent
Hideg et al.

(10) Patent No.: US 9,353,692 B2
(45) Date of Patent: May 31, 2016

(54) START-UP STRATEGY FOR HYBRID POWERTRAIN

(71) Applicants: Laszlo Hideg, Sterling Heights, MI (US); Zhenxing Fu, San Diego, CA (US); Xiaodong Liu, Windsor (CA); Dumitru Puiu, Sterling Heights, MI (US)

(72) Inventors: Laszlo Hideg, Sterling Heights, MI (US); Zhenxing Fu, San Diego, CA (US); Xiaodong Liu, Windsor (CA); Dumitru Puiu, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 810 days.

(21) Appl. No.: 13/687,694

(22) Filed: Nov. 28, 2012

(65) Prior Publication Data

US 2013/0151131 A1    Jun. 13, 2013

Related U.S. Application Data

(60) Provisional application No. 61/569,568, filed on Dec. 12, 2011.

(51) Int. Cl.
  *F02D 28/00* (2006.01)
  *B60K 6/48* (2007.10)
  *B60W 10/06* (2006.01)
  *B60W 10/08* (2006.01)
  (Continued)

(52) U.S. Cl.
  CPC .............. *F02D 28/00* (2013.01); *B60K 6/383* (2013.01); *B60K 6/48* (2013.01); *B60W 10/06* (2013.01); *B60W 10/08* (2013.01); *B60W 10/30* (2013.01); *B60W 20/00* (2013.01);
  (Continued)

(58) Field of Classification Search
  CPC ......... B60K 6/383; B60K 6/48; B60W 10/06; B60W 10/08; B60W 10/30; B60W 20/00; B60W 2510/0638; B60W 2510/107; B60W 2510/244; B60W 2540/16; B60W 2540/165; B60W 2710/1072; B60W 30/18027; B60W 30/194
  USPC .................... 701/112, 113; 123/179.3, 179.4, 123/179.28, 179.31; 180/65.265, 65.28, 180/65.7; 475/5, 331; 903/905, 910, 913
  See application file for complete search history.

(56) References Cited

U.S. PATENT DOCUMENTS 4,534,326 A * 8/1985 Bowcott ................ F02N 1/0803
                                                    123/179.3
7,316,283 B2 * 1/2008 Yamamoto ............ B60W 10/08
                                                    180/233

(Continued)

FOREIGN PATENT DOCUMENTS

DE        102006030041 A1     1/2008
JP        EP 1647707 A1 *     4/2006 ............. B60K 28/12

OTHER PUBLICATIONS

International Search Report dated Mar. 4, 2013 for International Application No. PCT/US2012/067337, International Filing Date Nov. 30, 2012.

(Continued)

*Primary Examiner* — Erick Solis
*Assistant Examiner* — Carl Staubach
(74) *Attorney, Agent, or Firm* — Ralph E. Smith (57) ABSTRACT

A start-up method for a hybrid powertrain in which hydraulic pressure is generated in a casual start-up by an electric oil pump motor where certain predetermined conditions are satisfied and the casual start-up is abandoned and hydraulic pressure is generated by an engine where the predetermined conditions are not satisfied. The casual start-up is also abandoned where a vehicle operator seeks propulsion shortly after start-up and before an oil pump is rotating within a predetermined threshold of an oil pump target RPM.

20 Claims, 5 Drawing Sheets

(51) Int. Cl.
  *B60W 10/30* (2006.01)
  *B60W 20/00* (2016.01)
  *B60W 30/18* (2012.01)
  *B60W 30/194* (2012.01)
  *F16H 61/00* (2006.01)
  *B60K 6/383* (2007.10)

(52) U.S. Cl.
  CPC ...... *B60W 30/18027* (2013.01); *B60W 30/194* (2013.01); *F16H 61/0028* (2013.01); *B60W 2510/0638* (2013.01); *B60W 2510/107* (2013.01); *B60W 2510/244* (2013.01); *B60W 2540/16* (2013.01); *B60W 2540/165* (2013.01); *B60W 2710/1072* (2013.01); *B60Y 2200/92* (2013.01); *B60Y 2300/18016* (2013.01); *B60Y 2300/192* (2013.01); *B60Y 2400/427* (2013.01); *Y02T 10/6221* (2013.01); *Y02T 10/6286* (2013.01)

(56) References Cited

U.S. PATENT DOCUMENTS

| | | | | |
|---|---|---|---|---|
| 8,465,392 B2* | 6/2013 | Allgaier | ............... | B60K 6/48 477/20 |
| 8,795,118 B2* | 8/2014 | Hideg | ............... | B60K 6/445 475/137 |
| 2002/0084118 A1* | 7/2002 | Esaki | ............... | B60K 6/383 180/65.25 |
| 2002/0091034 A1* | 7/2002 | Nakamori | ............... | B60K 6/485 477/3 |
| 2004/0038774 A1* | 2/2004 | Kuroda | ............... | B60K 6/485 477/3 |
| 2006/0054445 A1 | 3/2006 | Pashnik et al. | | |
| 2006/0272869 A1* | 12/2006 | Hidaka | ............... | B60K 6/48 180/65.25 |
| 2008/0011529 A1 | 1/2008 | Hoher et al. | | |
| 2009/0118878 A1* | 5/2009 | Park | ............... | B60K 6/48 701/22 |
| 2009/0280941 A1 | 11/2009 | Dusenberry et al. | | |
| 2010/0075798 A1* | 3/2010 | Suzuki | ............... | B60K 6/40 477/5 |
| 2013/0013176 A1* | 1/2013 | Bassindale | ............... | F02N 11/0803 701/113 |

OTHER PUBLICATIONS

Written Opinion dated Mar. 4, 2013 for International Application No. PCT/US2012/067337, International Filing Date Nov. 30, 2012.

* cited by examiner

START-UP STRATEGY FOR HYBRID POWERTRAIN

CROSS REFERENCE TO RELATED APPLICATION

This application claims priority to U.S. Provisional Ser. No. 61/569,568, filed Dec. 12, 2011.

FIELD

The present disclosure relates to a method for starting-up a hybrid powertrain and, more particularly, to a method for starting-up a hybrid powertrain in which the startup strategy varies depending upon the immediacy of propulsion required by a vehicle operator.

BACKGROUND

Current hybrid powertrain electric motors provide multiple functions including engine start, electric propulsion, electrical energy recovery, and synchronous shift strategy. Many hybrid powertrains allow vehicle operation while the internal combustion engine of the vehicle is completely turned off. To pressurize hydraulic oil, which allows for the operation of the clutches and other devices essential to the operation of the hybrid powertrain, an electrically powered oil pump typically must be operated while the internal combustion engine is switched off. The electrically powered oil pump is typically a small, low power pump for cost, packaging, efficiency and other reasons. Thus, when the hybrid powertrain is sitting idle, particularly in colder climates or for an extended period of time, the viscous nature of the hydraulic oil combined with the small size of the electrically powered oil pump can result in a several second delay from when the hybrid powertrain is activated to the time at which hydraulic pressure reaches sufficient pressures for transmission operation. In some circumstances, it may take over 2.25 seconds from the start-up ("crank") command to pressurize the hydraulic system until adequate pressure is achieved. A vehicle operator will typically get an error message if they attempt to operate the vehicle during this delay period. The error message typically requires the operator to turn off and then restart the vehicle, wasting time and causing operator frustration. Therefore, there is room for improvement in the art.

SUMMARY

In one form, the present disclosure provides a method for starting-up a hybrid powertrain including an engine, an over-running clutch coupled to the engine, an electric oil pump motor coupled to the over-running clutch, and an oil pump coupled to the electric oil pump motor. The method includes evaluating whether predetermined conditions for a casual start are satisfied upon a start-up command from a vehicle operator, starting the engine if the predetermined conditions are not satisfied, and activating the electric oil pump motor for a casual start without activating the engine if the predetermined conditions are satisfied.

In another form, the present disclosure provides a method for starting-up a hybrid powertrain for a vehicle including an engine, an electric propulsion motor, an over-running clutch coupled to the engine and the electric propulsion motor, an electric oil pump motor coupled to the over-running clutch, and an oil pump coupled to the electric oil pump motor. The method includes evaluating whether predetermined conditions for a casual start are satisfied upon a start-up command from a vehicle operator, starting the engine if the predetermined conditions are not satisfied, and activating the electric oil pump motor for a casual start without activating the engine if the predetermined conditions are satisfied. The casual start includes calculating the difference between an oil pump target RPM and the rotations per minute of the electric oil pump motor, and comparing the difference to a threshold value. The casual start also includes starting the engine and deactivating the electric oil pump motor once the rotations per minute of the engine equal or exceed the rotations per minute of the electric oil pump where the vehicle operator issues a shift command if the difference is greater than the threshold value, and continuing the casual start if the difference is less than the threshold value or the vehicle operator does not issue a shift command. The method also includes starting the engine and terminating the method once a predetermined amount of time has passed from the start-up command if the difference is greater than the threshold value.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Disclosed here are embodiments for a powertrain start-up strategy that provides a vehicle operator with the ability to operate a vehicle after a shorter delay period should the operator require quicker vehicle operation after initial start-up. It is desirable that the start-up strategy be capable of differentiating between a vehicle operator who requests immediate propulsion after vehicle start-up and a vehicle operator who does not and that the start-up strategy determines the appropriate powertrain start-up procedure in response to the vehicle operator's inputs.

Figure 1:
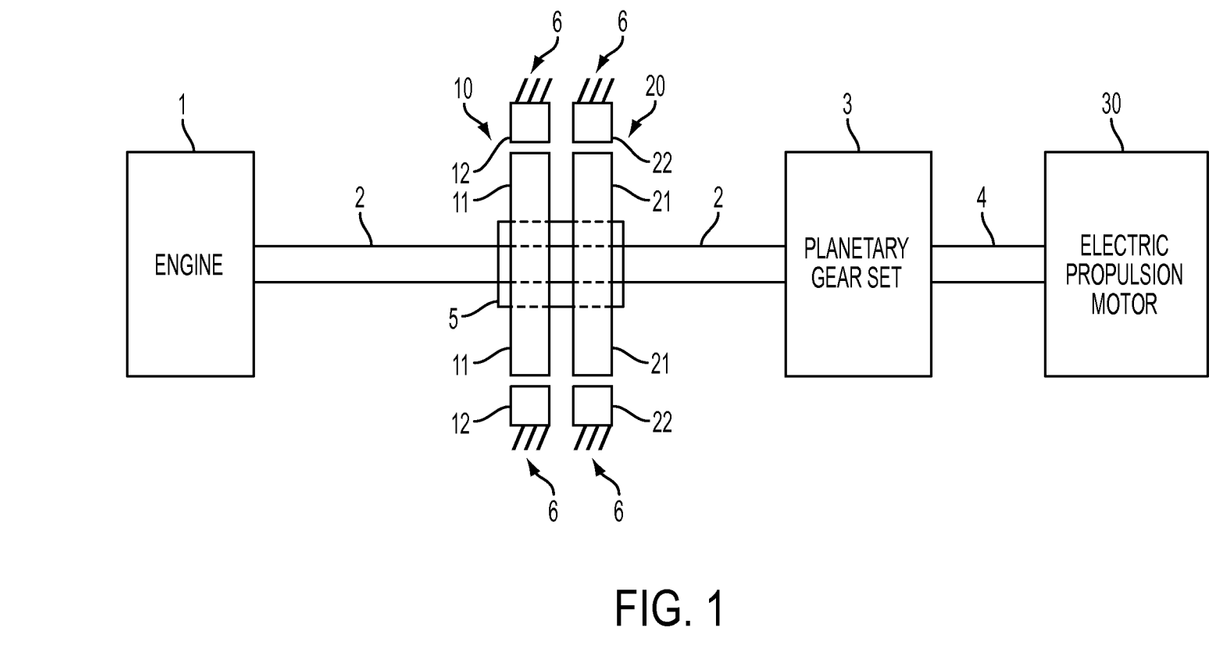
FIG. 1 is schematic representation of a side view of the hybrid powertrain according to the principles of the present disclosure.

FIG. 1 is schematic representation of a side view of a hybrid powertrain according to the principles of the present disclosure. The hybrid powertrain includes an engine 1, planetary gear set 3, and electric propulsion motor 30. The engine 1 is connected to the input of the planetary gear set 3 by a transmission input shaft 2. The transmission input shaft 2 may be the same shaft as an engine crankshaft or a different shaft. The output of the planetary gear set 3 is connected to the electric propulsion motor 30 by a transmission shaft 4. The planetary gear 3 set may be a planetary gear set or any other type of gear set as required by the operational considerations of the hybrid powertrain. The hybrid powertrain may be connected to the rest of the vehicle's drive train in any desired manner.

The transmission input shaft 2 includes an over-running clutch 5 concentrically mounted upon it. The over-running clutch 5 permits free rotational movement between the over-running clutch 5 and the transmission input shaft 2 in a first direction of rotation, but does not permit any rotation between the over-running clutch 5 and the transmission input shaft 2 in a second, opposite direction of rotation. Thus, the over-running clutch 5 may spin faster than the transmission input shaft 2 in the first direction of free rotation. The over-running clutch 5 may be a free-wheeling clutch, one-way bearing, or any other device that permits rotation between the over-running clutch 5 and the transmission input shaft 2 in the first direction, but not in the opposite direction.

The hybrid powertrain also includes an electric oil pump motor 10 and an oil pump 20. The electric oil pump motor 10 includes an electric oil pump motor rotor 11 coupled to the over-running clutch 5 and an electric oil pump motor stator 12 coupled to the transmission housing 6 of the hybrid powertrain. The oil pump 20 includes an oil pump impeller 21 coupled to the over-running clutch 5 and an oil pump housing 22 coupled to the transmission housing 6 of the hybrid powertrain. The electric oil pump motor rotor 11, oil pump impeller 21, and over-running clutch 5 are all coupled together and rotate synchronously around the transmission input shaft 2. The electric oil pump motor rotor 11, oil pump impeller 21, and over-running clutch 5 all rotate when the electric oil pump motor 10 is powered. The oil pump 20 is coupled to transmission hydraulics (not shown) as would be readily understood in the art.

During vehicle operation with the engine 1 running, the engine 1 causes the transmission input shaft 2 to rotate. The over-running clutch 5 is engaged while the engine 1 is on and, therefore, rotates synchronously with the transmission input shaft 2. During operation with the engine 1 on, the electric oil pump motor 10 is switched off and the over-running clutch 5 is engaged and rotating synchronously with the engine 1. Rotation of the over-running clutch 5 also rotates the electric oil pump motor rotor 11 and oil pump impeller 21, thereby creating oil pressure to power clutches within the hybrid powertrain and permit the powertrain's operation.

When the engine 1 is not running but the vehicle is powered on, the electric oil pump motor 10 is activated to provide hydraulic pressure for the hybrid powertrain. Activation of the electric oil pump motor 10 causes the electric oil pump motor rotor 11, over-running clutch 5, and oil pump impeller 21 to rotate, thereby creating hydraulic pressure. The engine 1 and transmission input shaft 2 do not rotate while the engine is turned off. Meanwhile, the over-running clutch 5 rotates freely about the transmission input shaft 2.

During the start-up ("crank") and operation of the hybrid powertrain, hydraulic pressure may be generated exclusively by the electric oil pump motor 10 or by the engine 1. In some circumstances, it may be desirable to operate the hybrid powertrain in a purely electric mode in which vehicle propulsion is provided by an electric propulsion motor, that may be the same as or different from the electric propulsion motor 30, while the engine 1 remains turned off. In this configuration, power to run the oil pump 20 and provide hydraulic pressure for the hybrid powertrain must be exclusively provided by the electric oil pump motor 10. However, the electric oil pump motor 10 may be unable to provide sufficient power to the oil pump 20 to generate sufficient hydraulic pressure within a desired amount of time in some circumstances. In these circumstances, it becomes necessary to start the engine 1 to provide adequate oil pressure. Starting the engine 1 reduces the amount of time required to build adequate hydraulic pressure within the hybrid powertrain. However, starting the engine 1 eliminates some of the benefits of the hybrid powertrain such as fuel savings, noise reduction, and pollution reduction. Thus, it is desirable whenever possible to avoid starting the engine 1. The start-up strategy disclosed herein selectively determines whether a purely electric vehicle start ("casual start") using the electric oil pump motor 10 only is feasible or whether the vehicle's engine 1 must be turned on to operate the vehicle within a desired amount of time.

Figure 2:
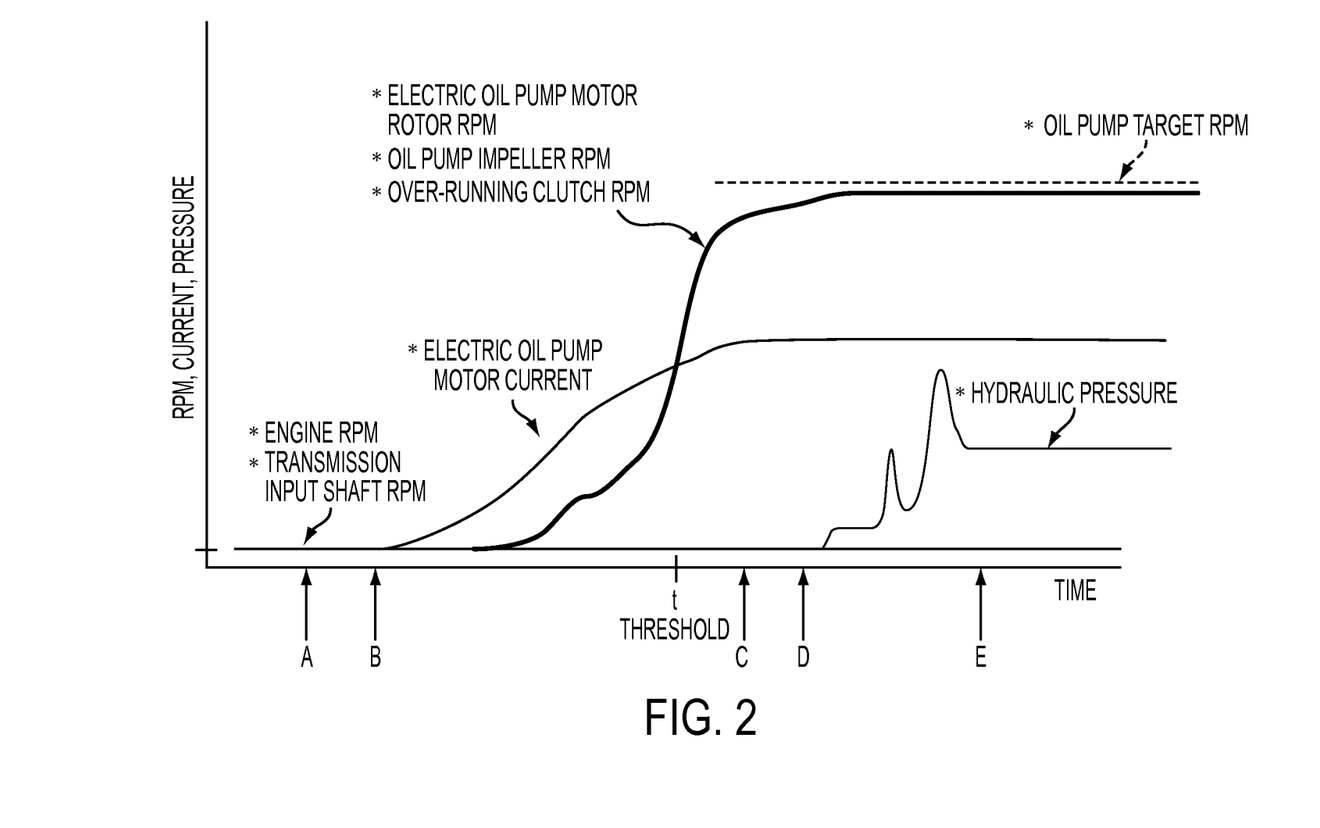
FIG. 2 is a graph of exemplary RPM of the engine, transmission input shaft, electric oil pump motor rotor, oil pump impeller, and over-running clutch; the transmission hydraulic pressure; and the electric oil pump motor current for a start-up using only the electric oil pump motor.

FIG. 2 is a graph of example rotations per minute ("RPM") of the engine, transmission input shaft, electric oil pump motor rotor, oil pump impeller, and over-running clutch; the transmission hydraulic pressure; and the electric oil pump motor current for a start-up using only the electric oil pump motor 10. The graph of FIG. 2 reflects a casual start-up of the hybrid powertrain. With reference to FIG. 2, before a vehicle start (Point A), initially, none of the components of the hybrid powertrain are rotating. The start-up strategy begins at vehicle start (A). The start-up strategy calls for a set of pre-determined conditions to be evaluated to determine if a casual start using only the electric oil pump motor 10 to power the oil pump 20 is feasible. For instance, the temperature of the hybrid powertrain may be evaluated. The electric oil pump motor 10 may simply be unable to power the oil pump 20 if the hybrid powertrain is too cold and the hydraulic fluid is too viscous. In such a case, the hybrid powertrain forgoes a casual start using just the electric oil pump motor 10 to power the oil pump 20 and, instead, activates the engine 1 to power the oil pump 20. Likewise, the hybrid powertrain may forego a casual start where the charge of the hybrid powertrain's batteries is depleted. For instance, it would be undesirable to utilize the batteries to power the electric oil pump motor 10 if doing so would jeopardize the batteries' ability to be used to later start the engine 1. In another embodiment, a casual start may be abandoned for safety reasons (e.g., where the vehicle's hood is open) or for performance reasons (e.g., where the vehicle is in a towing mode). In one embodiment, the casual start may be abandoned where a fault is detected in the vehicle's electrical system or where a problem is detected with the electric oil pump motor 10. There may be other circumstances in which it would be desirable to abandon a casual start and the above-listed circumstances are not limiting. The default start-up mode is a casual start. However, any number of desired conditions may cause a casual start to be aborted and the vehicle's engine 1 to be immediately engaged. In the event a casual start is aborted, the engine 1 is immediately engaged and the start-up strategy is completed. Also at Point A, a timer is initiated and starts timing the process from crank until the electric oil pump motor rotor 11 and thereby, oil pump impeller 21 are within a predetermined threshold of RPM from an oil pump target RPM.

Assuming a casual start has not been aborted, shortly after and in response to crank, an electric oil pump motor current forms at Point B to power the electric oil pump motor 10. Shortly after the electric oil pump motor current is generated at Point B, the electric oil pump motor rotor 11, oil pump impeller 21, and over-running clutch 5 begin to rotate and the RPM of the electric oil pump motor 10 is monitored. After Point B, the RPM of the oil pump impeller 21 starts to build. The oil pump impeller 21 is within the predetermined threshold of RPM from the oil pump target RPM at Point $t_{threshold}$ and approaches steady state operation. The threshold RPM is the minimum difference between the oil pump target RPM and the oil pump impeller RPM required to allow the casual start to proceed. In one embodiment, the target RPM of the oil pump impeller 21 is approximately 700 RPM. In some embodiments the oil pump target RPM may be higher or lower than 700 RPM. In one embodiment, the oil pump target RPM is approximately equal to the idle RPM of the engine 1. The threshold value may be temperature and/or time dependent. The threshold value may vary according to any factors desired. In one embodiment, the threshold value may be approximately 100 to 150 RPM. In one embodiment, the threshold value may be greater than 150 RPM or less than 100 RPM. The timer expires at Point C.

The start-up strategy constantly evaluates whether the threshold is exceeded between Points A and C. A vehicle operator may desire to operate the vehicle during the period of time between Points A and C. For instance, the vehicle operator may issue a shift command by shifting the vehicle from "Park" to "Drive." Should this occur between Points A and C while the threshold is exceeded, the casual start is aborted and the engine 1 is activated. The casual start will continue if the threshold value is not exceeded and a shift command has been issued. The casual start will also continue even if the threshold value is exceeded if the timer has not expired and no shift command has been issued.

In the example of FIG. 2, the threshold is exceeded at Point $t_{threshold}$, and the timer expires at Point C, after the threshold is exceeded. A shift command is issued at Point D and, because the threshold is not exceeded, the transmission will continue the casual start while also providing for electric vehicle operation. In some circumstances, such as where propulsive force greater than that which can be provided by the electric propulsion motor 30 is required, the engine 1 may be activated even if a casual start would be otherwise appropriate. In one embodiment, the timer will expire at Point C about 1.25 seconds after crank. In one embodiment, the timer may expire before or after 1.25 seconds. After the shift command at Point D, hydraulic pressure builds within the hybrid transmission. The shift is completed at Point E after adequate hydraulic pressure has been achieved. The RPM of the engine 1 and transmission input shaft 2 remain at zero throughout the entire process because the casual start procedure was allowed to proceed. In one embodiment, adequate oil pressure to complete a shift is about 1000 kPa. In one embodiment, the adequate oil pressure may be higher or lower than 1000 kPa. The start-up strategy is completed and is not implemented again for the remainder of operation of the vehicle once the shift is completed at Point E. The start-up strategy is repeated the next time the vehicle is turned on.

Figure 3:
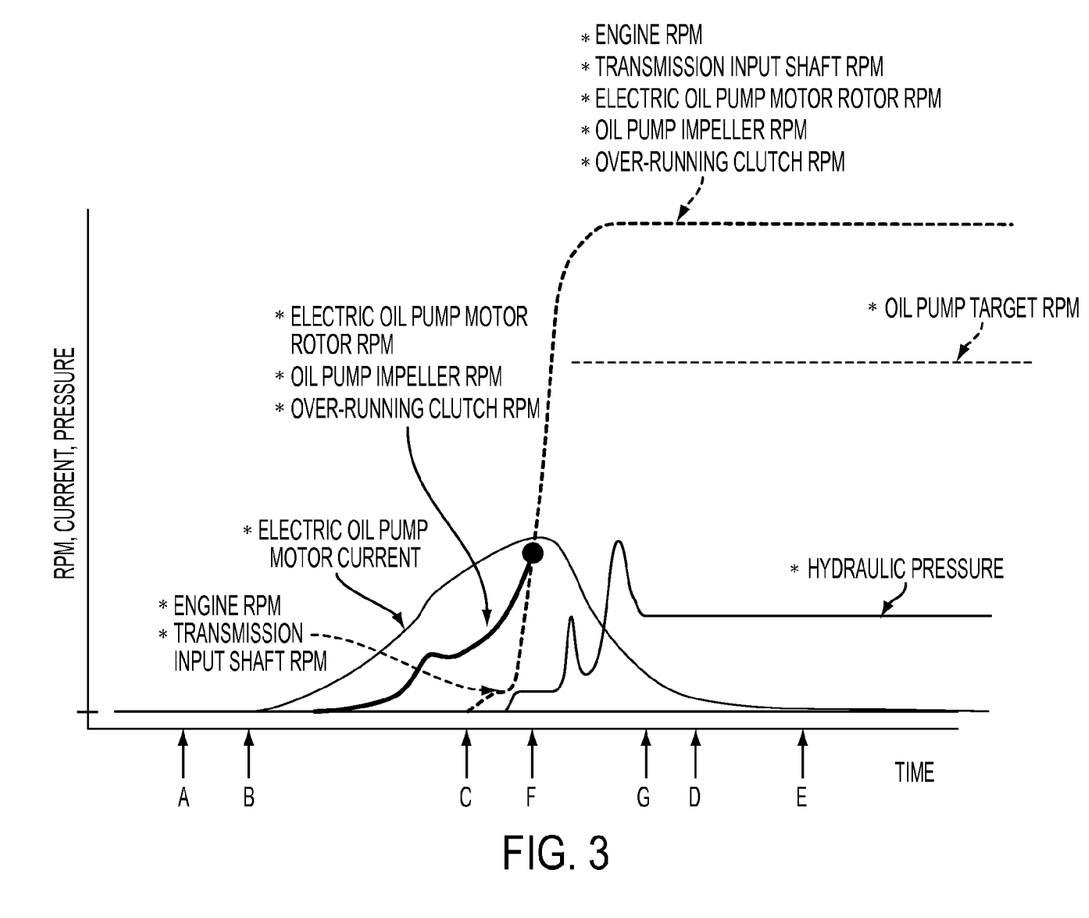
FIG. 3 is a graph of exemplary RPM of the engine, transmission input shaft, electric oil pump motor rotor, oil pump impeller, and over-running clutch; the transmission hydraulic pressure; and the electric oil pump motor current for a start-up using the engine.

FIG. 3 is a graph of exemplary RPM of the engine, transmission input shaft, electric oil pump motor rotor, oil pump impeller, and over-running clutch; the transmission hydraulic pressure; and the electric oil pump motor current for another start-up using the engine. The graph of FIG. 3 reflects a start-up strategy where the electric oil pump motor 10 is unable to cause the oil pump impeller 21 RPM to fall within the threshold value of the oil pump target speed by the time the timer has expired at Point C. This may occur because of a fault in the transmission, cold temperatures or other factors. In the strategy of FIG. 3, a shift command (Point D) is not issued by the vehicle operator until after the timer has expired at Point C. With reference to FIG. 3, before a vehicle start (Point A), none of the components of the hybrid powertrain are initially rotating. At crank (Point A), the start-up strategy begins. As in the process of FIG. 2, a set of predetermined conditions are evaluated to determine if a casual start using only the electric oil pump motor 10 to power the oil pump 20 is feasible. A casual start is initially feasible in the example of FIG. 3. The timer also begins at Point A. An electric oil pump motor current forms at Point B to power the electric oil pump motor 10. Shortly after the electric oil pump motor current is generated at Point B, the electric oil pump motor rotor 11, oil pump impeller 21, and over-running clutch 5 begin to rotate and the RPM of the electric oil pump motor 10 are monitored. After Point B, the RPM of the oil pump impeller 21 builds.

In the example of FIG. 3, the timer expires at Point C and the threshold value is also exceeded at Point C. Because the threshold value is exceeded and the timer has expired at Point C, the casual start is aborted and the engine 1 is activated at Point C. The start-up strategy is terminated once the engine 1 is activated. The engine 1 RPM begin to increase towards the engine's 1 idle RPM once the engine 1 is activated at Point C. In one embodiment, the idle RPM of the engine 1 is about 600 to about 700 RPM. In one embodiment, the idle RPM of the engine 1 may be below 600 RPM or above 700 RPM. The RPM of the engine 1 steadily increase until they equal the RPM of the oil pump impeller 21 which occurs at Point F. At Point F, the over-running clutch 5 locks the oil pump impeller 21, transmission input shaft 2, and engine 1 together and the RPM of the oil pump impeller 21 and engine 1 climb in unison. The electric oil pump motor 10 is turned off at Point F and the current powering the electric oil pump motor 10 drops to zero. The RPM of the oil pump impeller 21 and engine 1 continue to increase, exceed the oil pump target RPM, and approach the engine 1 idle RPM. At Point G adequate hydraulic pressure to operate the hybrid powertrain is achieved utilizing the power of the engine 1. A vehicle operator finally issues a gear command at Point D, after adequate hydraulic pressure has been achieved at Pont G, and the shift is completed at Point E.

Figure 4:
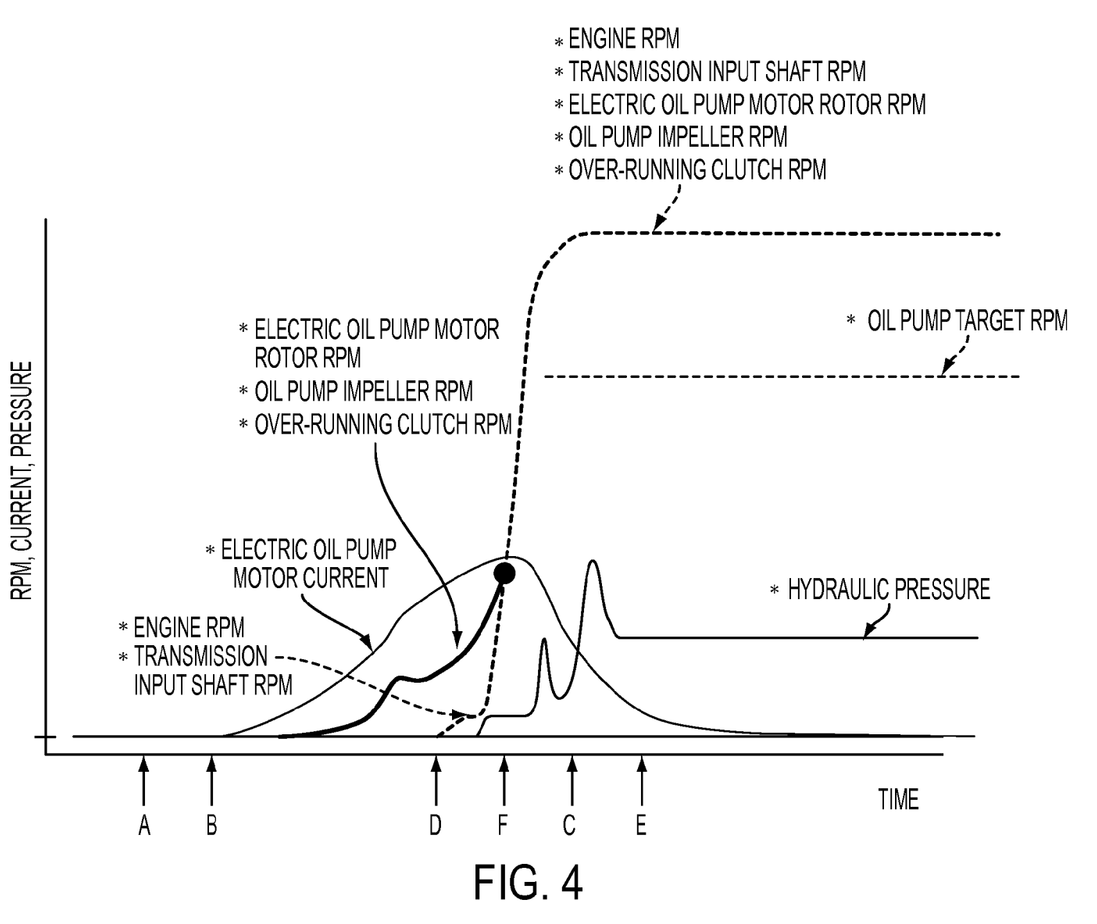
FIG. 4 is a graph of exemplary RPM of the engine, transmission input shaft, electric oil pump motor rotor, oil pump impeller, and over-running clutch; the transmission hydraulic pressure; and the electric oil pump motor current for another start-up using the engine.

FIG. 4 is a graph of example RPM of the engine, transmission input shaft, electric oil pump motor rotor, oil pump impeller, and over-running clutch; the transmission hydraulic pressure; and the electric oil pump motor current for a start-up using only the engine 1. The graph of FIG. 4 reflects a start-up procedure where a casual start-up has been abandoned in favor of a more rapid powertrain activation in which the engine 1 is used to power the oil pump 20 and create hydraulic pressure. With reference to FIG. 4, before a vehicle start (Point A), none of the components of the hybrid powertrain are initially rotating. At crank (Point A), the start-up strategy begins. As in the process of FIGS. 2-3, a set of predetermined conditions are evaluated to determine if a casual start using only the electric oil pump motor 10 to power the oil pump 20 is feasible. A casual start is initially feasible in the example of FIG. 3. The timer also begins at Point A. An electric oil pump motor current forms at Point B to power the electric oil pump motor 10. Shortly after the electric oil pump motor current is generated at Point B, the electric oil pump motor rotor 11, oil pump impeller 21, and over-running clutch 5 begin to rotate and the RPM of the electric oil pump motor 10 are monitored. After Point B, the RPM of the oil pump impeller 21 builds.

In the example of FIG. 4, a vehicle operator issues a gear command at Point D. The casual start is aborted because the difference between the oil pump impeller 21 RPM and the oil pump target RPM exceeds the threshold value. Because the casual start was aborted, the timer is no longer of consequence in this iteration of the start-up strategy. Hydraulic pressure builds within the hybrid transmission in response to the gear command. However, hydraulic pressure is insufficient to complete the shift at this point in time. Thus, the engine 1 is activated at Point D and begins to increase in RPM towards the engine's 1 idle RPM. The start-up strategy is terminated once the engine 1 is activated. In one embodiment, the idle RPM of the engine 1 is about 600 to about 700 RPM. In one embodiment, the idle RPM of the engine 1 may be below 600 RPM or above 700 RPM. The RPM of the engine 1 steadily increases until it equals that of the oil pump impeller 21 at Point F. At Point F, the over-running clutch 5 locks the oil pump impeller 21, transmission input shaft 2, and engine 1 together and the RPM of the oil pump impeller 21 and engine 1 climb in unison. The electric oil pump motor 10 is turned off at Point F and the current powering the electric oil pump motor 10 drops to zero. The RPM of the oil pump impeller 21 and engine 1 continue to increase, exceed the oil pump target RPM, and approach the engine 1 idle RPM. At Point C the timer expires. Adequate hydraulic pressure to operate the hybrid powertrain is achieved with the power of the engine 1 by Point E and the shift is completed at Point E.

Figure 5:
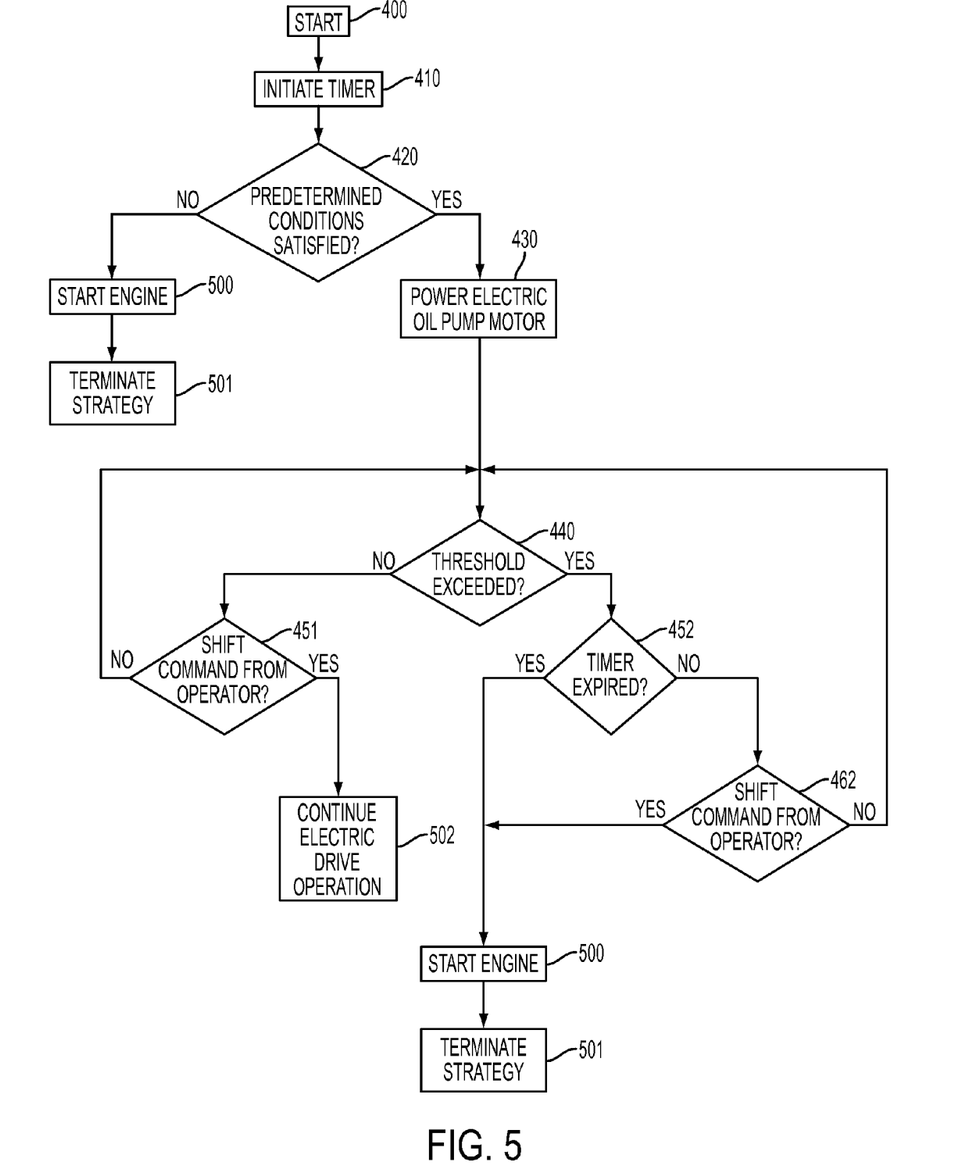
FIG. 5 is a flow chart of a start-up strategy according to the principles of the present disclosure.

FIG. 5 is a flow chart of a start-up strategy according to the principles of the present disclosure. The start-up strategy begins with a start command (step 400) by a vehicle operator. After a start command, the timer is initiated (step 410) and the predetermined conditions are evaluated (step 420). The engine 1 is started (step 500) if the predetermined conditions are not satisfied. The start-up strategy is terminated (step 501) after the engine 1 is started and the electric oil pump motor 10 is deactivated (step 500).

In the event the predetermined conditions are satisfied, the electric oil pump motor 10 is powered (step 430). The strategy evaluates whether or not the threshold value is exceeded (step 440). In the event the threshold value is exceeded, the start-up strategy determines whether or not the timer has expired (step 452). The engine 1 is started and the electric oil pump motor 10 is deactivated (step 500), and the start-up strategy is terminated (step 501) if the timer is expired. If the timer is not expired, the start-up strategy determines whether or not a shift command has been issued by the vehicle operator (step 462). If a shift command has been issued, the engine 1 is started and the electric oil pump motor 10 is deactivated (step 500), and the start-up strategy is terminated (step 501). If a shift command has not been issued, start-up strategy returns to step 440 and repeats the strategy. In the event the threshold has not been exceed, the start-up strategy determines whether or not a shift command has been issued (step 451). In the event a shift command has been issued, the start-up strategy provides for electric vehicle operation (step 502). In the event a shift command has not been issued, the start-up strategy returns to step 440 and repeats the strategy.

The disclosed start-up strategy may be used with any hybrid powertrain including, but not limited to, a single electric motor hybrid powertrain or two electric motor hybrid powertrain. In a two electric motor hybrid powertrain, either electric motor or both electric motors in combination may provide the assist for the oil pump electric motor. Additional steps may be added to the start-up strategy or the order of the steps of the start-up strategy may be adjusted as desired.

Thus, a powertrain start-up strategy that provides a vehicle operator with the ability to operate a vehicle after a shorter delay period should the operator require quicker vehicle operation after initial start-up is provided. In one embodiment, the start-up strategy is capable of differentiating between a vehicle operator who requests immediate propulsion after vehicle start-up and a vehicle operator who does not, and determining the appropriate powertrain start-up procedure in response to the vehicle operator's inputs.

What is claimed is:

1. A method for starting-up a hybrid powertrain comprising an engine, an over-running clutch coupled to the engine, an electric oil pump motor coupled to the over-running clutch, and an oil pump coupled to the electric oil pump motor, the method comprising:
    in response to a vehicle start-up command from a vehicle operator, evaluating whether predetermined conditions for a casual start are satisfied, the casual start involving only the electric oil pump motor powering the oil pump to generate a desired oil pressure within a desired start-up time period, the predetermined conditions including oil temperature, and the desired oil pressure being for operation of a transmission of the hybrid powertrain;
    starting the engine when the predetermined conditions are not satisfied; and
    activating the electric oil pump motor for the casual start without activating the engine when the predetermined conditions are satisfied.

2. The method of claim 1, further comprising when the predetermined conditions are satisfied:
    calculating a difference between an oil pump target rotations per minute and a rotations per minute of the electric oil pump motor;
    comparing the difference to a threshold value;
    when the difference is greater than the threshold value and the vehicle operator issues a shift command, starting the engine and then deactivating the electric oil pump motor once a rotations per minute of the engine equal or exceed the rotations per minute of the electric oil pump; and
    continuing the casual start if when the difference is less than the threshold value or the vehicle operator does not issue a shift command.

3. The method of claim 2, further comprising starting the engine and terminating the method after a predetermined amount of time has passed from the start-up command when the difference is greater than the threshold value.

4. The method of claim 3, further comprising a gear set coupled to both the over-running clutch and an electric propulsion motor, wherein the over-running clutch is coupled to the engine such that the over-running clutch can freely rotate with respect to the engine in a first direction of rotation.

5. The method of claim 4, further comprising a battery coupled to the electric propulsion motor and the electric oil pump motor, wherein the predetermined conditions include the state of the charge of the battery.

6. The method of claim 5, wherein the predetermined conditions include whether a hood on a vehicle housing the hybrid powertrain is open and whether the vehicle is configured for operation in a towing mode.

7. The method of claim 5, wherein the oil pump target rotations per minute is approximately 700 rotations per minute.

8. The method of claim 5, wherein the threshold is between approximately 100 and 150 rotations per minute.

9. The method of claim 5, wherein the predetermined amount of time is 1.25 seconds.

10. The method of claim 5, wherein the engine is not started once the predetermined amount of time expires when, prior to the expiration of the predetermined amount of time, the vehicle operator has issued a transmission shift command and the threshold is not exceeded, unless the vehicle operator desires greater propulsive force than the electric propulsion motor is capable of providing.

11. A method for starting-up a hybrid powertrain for a vehicle comprising an engine, an electric propulsion motor, an over-running clutch coupled to the engine and the electric propulsion motor, an electric oil pump motor coupled to the over-running clutch, and an oil pump coupled to the electric oil pump motor, the method comprising:

in response to a vehicle start-up command from a vehicle operator, evaluating whether predetermined conditions for a casual start are satisfied, the casual start involving only the electric oil pump motor powering the oil pump to generate a desired oil pressure within a desired start-up time period, the predetermined conditions including oil temperature, and the desired oil pressure being for operation of a transmission of the hybrid powertrain;

starting the engine when the predetermined conditions are not satisfied;

activating the electric oil pump motor for the casual start without activating the engine when the predetermined conditions are satisfied:

calculating the difference between an oil pump target rotations per minute and the rotations per minute of the electric oil pump motor,         comparing the difference to a threshold value,         when the vehicle operator issues a transmission shift command, starting the engine and then deactivating the electric oil pump motor once the rotations per minute of the engine equal or exceed the rotations per minute of the electric oil pump when the difference is greater than the threshold value, and         continuing the casual start when the difference is less than the threshold value or the vehicle operator does not issue a shift command; and     starting the engine and terminating the method after a predetermined amount of time has passed from the start-up command when the difference is greater than the threshold value.

12. The method of claim 11, further comprising a gear set coupled to both the over-running clutch and the electric propulsion motor, wherein:

the over-running clutch is coupled to the engine such that the over-running clutch can freely rotate with respect to the engine in a first direction of rotation, but fixedly rotates with the engine in a second, opposite direction of rotation, and     the threshold is between approximately 100 and 150 rotations per minute.

13. The method of claim 12, wherein the oil pump target rotations per minute is approximately 700 rotations per minute.

14. The method of claim 12, wherein the predetermined amount of time is 1.25 seconds.

15. The method of claim 12, further comprising a battery coupled to the electric propulsion motor and the electric oil pump motor, wherein the predetermined conditions include the state of the charge of the battery, whether a hood on a vehicle housing the hybrid powertrain is open, and whether the vehicle is configured for operation in a towing mode.

16. The method of claim 12, wherein the engine is not started once the predetermined amount of time expires when, prior to the expiration of the predetermined amount of time, the vehicle operator has issued a shift command and the threshold is not exceeded, unless the vehicle operator desires greater propulsive force than the electric propulsion motor is capable of providing.

17. The method of claim 13, wherein the predetermined amount of time is 1.25 seconds.

18. The method of claim 13, further comprising a battery coupled to the electric propulsion motor and the electric oil pump motor, wherein the predetermined conditions include the state of the charge of the battery, the temperature of the hybrid powertrain, whether a hood on a vehicle housing the hybrid powertrain is open, and whether the vehicle is configured for operation in a towing mode.

19. The method of claim 18, wherein the engine is not started once the predetermined amount of time expires when, prior to the expiration of the predetermined amount of time, the vehicle operator has issued a shift command and the threshold is not exceeded, unless the vehicle operator desires greater propulsive force than the electric propulsion motor is capable of providing.

20. A system for starting up a hybrid powertrain for a vehicle having an engine, an electric propulsion motor, a transmission, an oil pump configured to generate hydraulic fluid pressure for the transmission, and an electric oil pump motor coupled to the oil pump, the system comprising:

an input device configured to receive a vehicle start-up command from a vehicle operator;

a temperature sensor configured to measure a temperature indicative of a temperature of the hydraulic fluid; and     a controller configured to, in response to receiving the vehicle start-up command:

evaluate whether predetermined conditions for a casual start are satisfied, the casual start involving only the electric oil pump motor powering the oil pump to generate the hydraulic fluid pressure within a desired start-up time period, the predetermined conditions including at least the measured temperature being above a temperature threshold;

start the engine to power the oil pump when the predetermined conditions are not satisfied; and         activating the electric oil pump motor to power the oil pump for the casual start without activating the engine when the predetermined conditions are satisfied.

\* \* \* \* \*